July 30, 1946.  A. H. BENNETT ET AL  2,404,770
OPTICAL SCANNING DEVICE AND PROCESS OF MAKING ARTICLES THEREWITH
Filed Aug. 19, 1943  3 Sheets-Sheet 1

Inventor
ALVA H. BENNETT
EDGAR D. TILLYER
By Raymond A. Paquin  Attorney

July 30, 1946. A. H. BENNETT ET AL 2,404,770
OPTICAL SCANNING DEVICE AND PROCESS OF MAKING ARTICLES THEREWITH
Filed Aug. 19, 1943    3 Sheets-Sheet 2
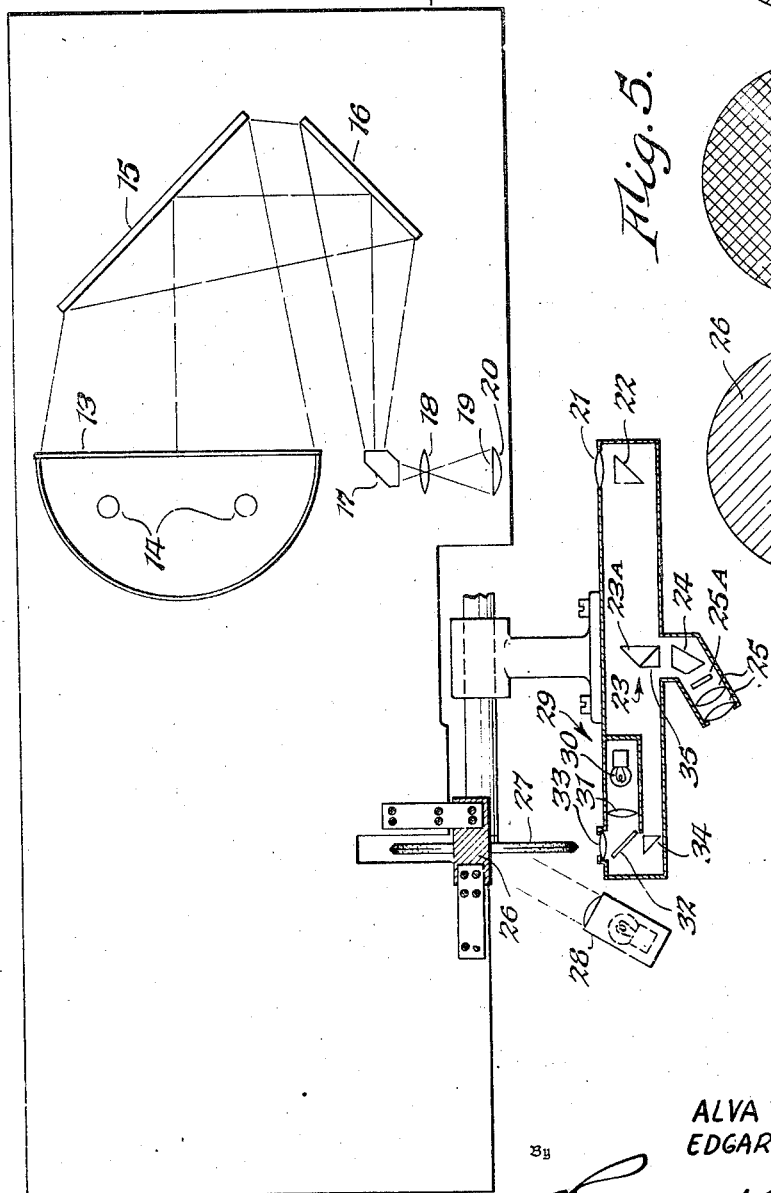
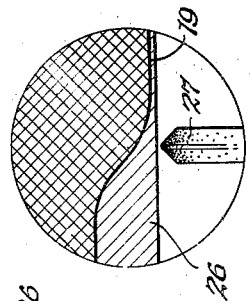
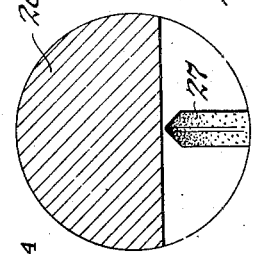
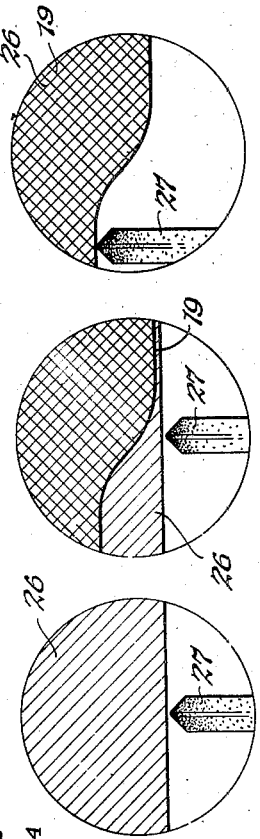
Inventor
ALVA H. BENNETT
EDGAR D. TILLYER
By Raymond A. Paquin
Attorney

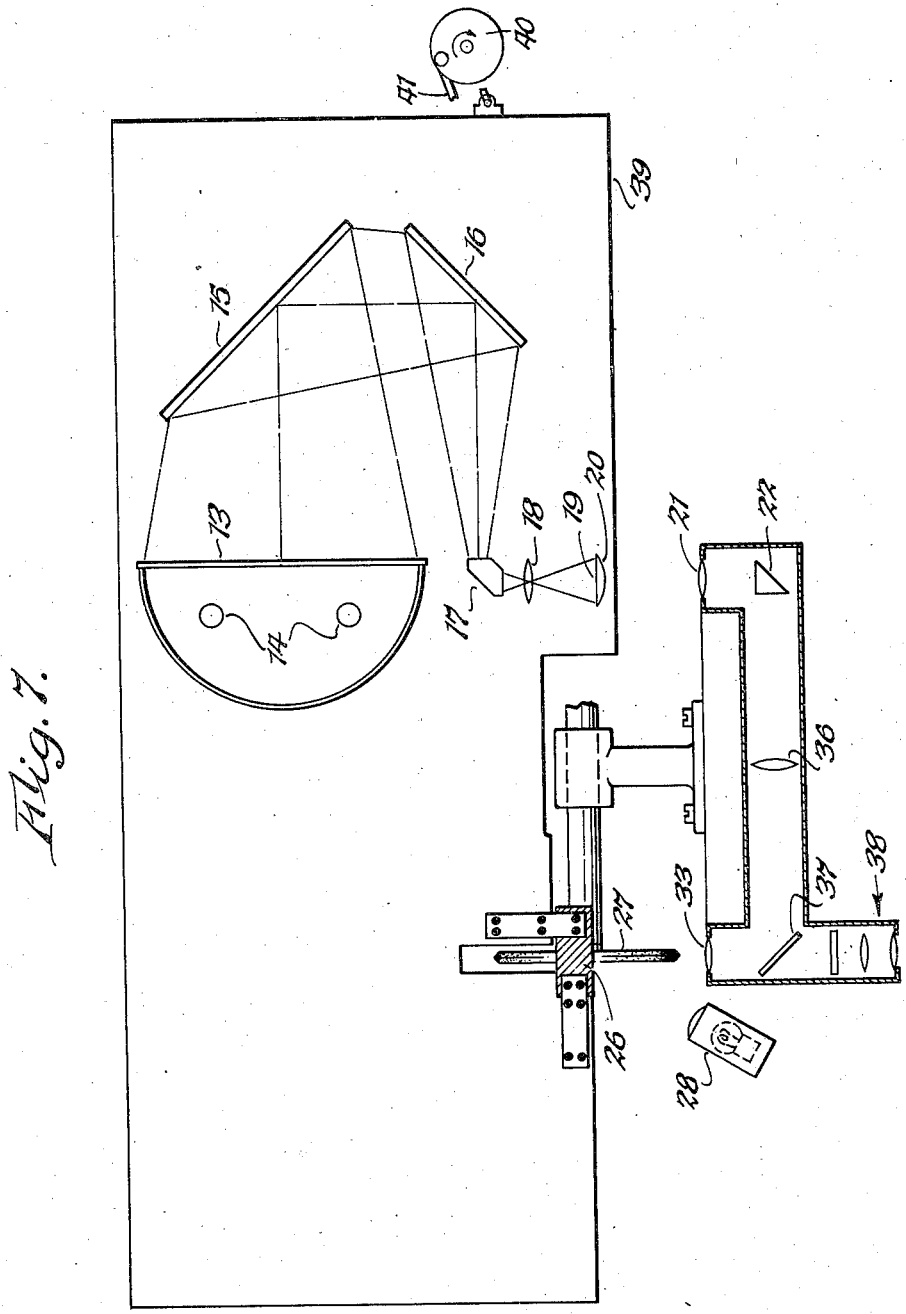

Patented July 30, 1946

2,404,770

UNITED STATES PATENT OFFICE 2,404,770

OPTICAL SCANNING DEVICE AND PROCESS OF MAKING ARTICLES THEREWITH

Alva H. Bennett, Kenmore, N. Y., and Edgar D. Tillyer, Southbridge, Mass., assignors, by mesne assignments, to American Optical Company, Southbridge, Mass., a voluntary association Application August 19, 1943, Serial No. 499,280

7 Claims. (Cl. 51—165)

This invention relates to optical scanning devices and has particular reference to a new and improved means and method for use in connection with the reproducing in the work, the configuration or profile of a master outline.

An object of the invention is to provide a new and improved optical scanning device for use with forming machines such as profile grinders, milling machines, thread grinders, engraving or routing machines or other profile forming machines wherein the outline of a master may be duplicated in the work and which allows the observing of the work and tool during the forming operation and the method of forming articles therewith.

Another object of the invention is to provide an optical scanning device for use with machines of the type set forth which facilitates and allows more accurate and faster reproduction of a master outline upon the work piece.

Another object of the invention is to provide a device of the type set forth which allows continuous observation and continuous following or scanning of the master outline which is seen superimposed upon the work piece.

Another object of the invention is to provide a device of the type set forth wherein an image of the master outline is projected upon the work piece and which allows the observation of such superimposed image on the work during the forming operation.

Other objects and advantages of the invention will be apparent from the following description taken in connection with the accompanying drawings. It will be understood that many changes may be made in the details of construction, arrangement of parts and steps of the process without departing from the scope of the invention as expressed in the accompanying claims. I, therefore, do not wish to be limited to the exact details of construction, arrangement of parts, and steps of the process shown and described as the preferred form has been shown by way of illustration only.

Referring to the drawings:

Fig. 2 is a view similar to Fig. 1 but showing another form of the invention.

Fig. 4 is a view of the image of the tool blank and tool alone as seen in the eyepiece;

Fig. 5 is a view of tool blank and superimposed image of the master drawing as seen in the eyepiece;

Fig. 6 is a view of the finished work and tool with superimposed image of the master drawing as seen in the eyepiece; and Fig. 7 is a view similar to Fig. 2 but showing another adaptation of the invention.

Figure 1:
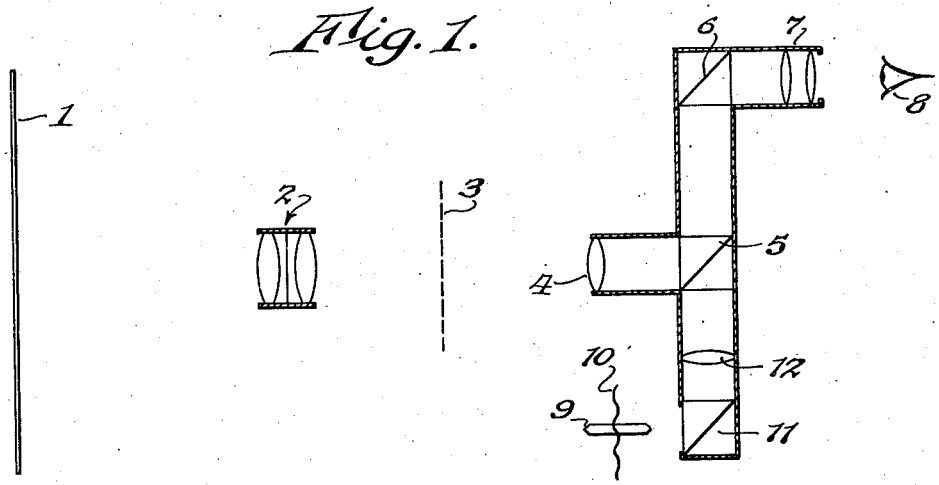
Fig. 1 is a diagrammatic view showing a simplified form of the invention.

Referring more particularly to the drawings wherein similar reference characters designate corresponding parts throughout the several views, the simplified form of invention shown in Fig. 1 comprises a master such as a drawing 1 and a projection objective lens system 2 adapted to form at 3 an image of the master. Aligned with the master 1 and lens system 2 is the objective 4 adapted to project the image of the screen 1 onto the half silvered prism 5 by which the image is reflected to the reflecting prism 6 which reflects said image through the ocular or eyepiece 7 into the eye 8 of the operator. Simultaneously an image of the grinding wheel 9 and profile 10 of the tool or work blank is reflected by the reflecting prism 11 through the objective 12 and through the half silvered prism 5 and is reflected through the ocular 7 into the eye by means of the prism 6.

The image as seen in the eyepiece comprises an image of the tool or work blank with an image of the master drawing superimposed thereon and allows the operator to guide the tool to duplicate the outline or profile of the master drawing on the tool blank.

It is pointed out that the master drawing may be illuminated indirectly by lights behind said master or by oblique illumination or both. Also the work blank and grinding wheel may be illuminated by oblique or other suitable illumination.

The work blank 10, master drawing 1 and lens system 2 are mounted for simultaneous movement. They may be mounted on a table or the like and are adatped to be adjusted simultaneously relative to the ocular 7 and its cooperating objectives 4 and 12 to retain superimposed relation of the images seen in the eyepiece.

In Fig. 2 is shown a more elaborate and for some purposes a preferable form of the invention. In this form there is provided the master such as a drawing or the like 13 with the fluorescent lamp 14 behind said drawing 13 and adapted to illuminate the same. If desired oblique illumination may also be employed either alone or in addition to the form of illumination shown. The reflector 15 is aligned with the drawing 13 and is adapted to reflect an image of such drawing 13 into a second reflector 16 which in turn reflects said image into the right angle roof prism 17 which inverts the image and reflects the image through the projection objective 18 forming an image at 19. If desired a collector lens 20 may be employed. The image then passes through the objective 21 into the reflecting prism 22 which reflects said image into the portion 23A of the half silvered prism 23 by which it is reflected into the roof prism 24 which inverts the image and reflects said image into the ocular or eyepiece 25. A reticule 25A may be provided in said ocular.

The work or tool blank 26 and the grinding wheel 27 are adapted to be illuminated by the oblique illuminator 28 and/or the vertical type illuminator 29. The illuminator 29 comprises the lamp 30, condensing lens system 31 and partial reflector 32. An image of the tool blank 26 passes through the objective 33 and is reflected by the reflecting prism 34 into the portion 35 of the half silvered prism by which it is reflected into the roof prism 24 which inverts the image and reflects the image into the ocular or eyepiece 25 where the image of the master drawing is seen superimposed upon the image of said tool blank 26 and grinding wheel 27.

Figure 3:
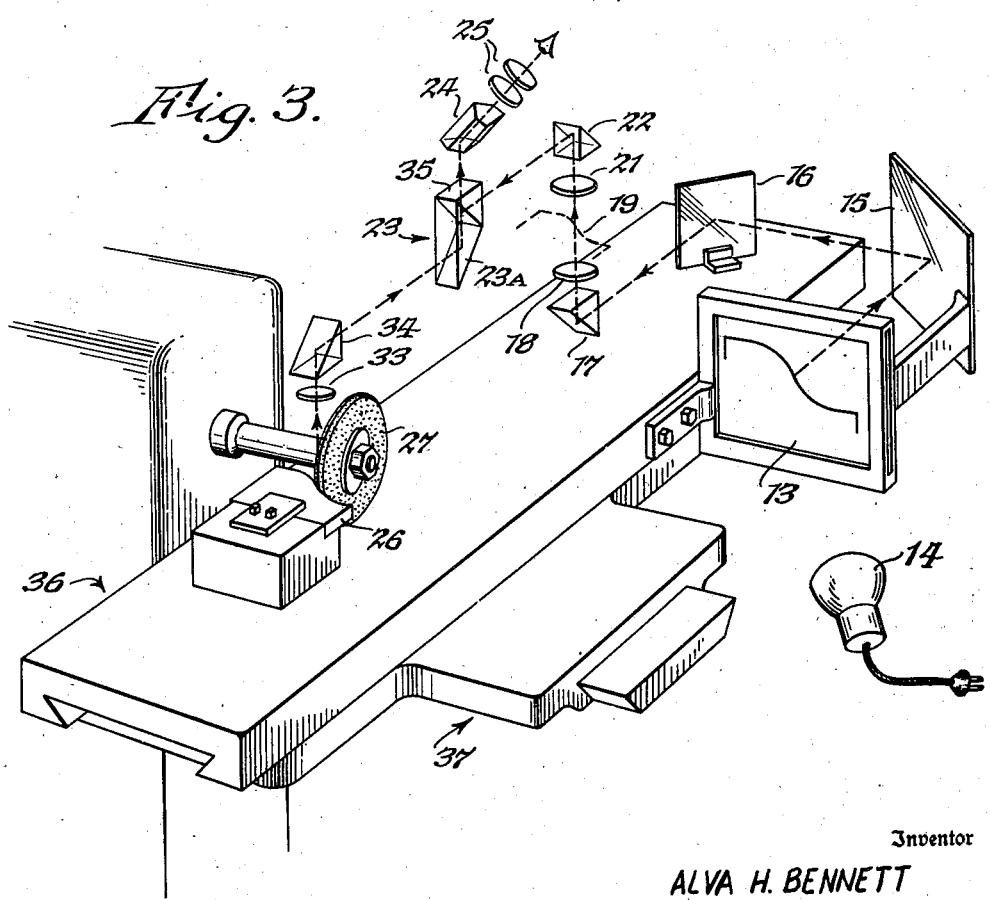
Fig. 3 is a perspective view of the device of Fig. 2 adapted for use with a milling machine.

In Fig. 3 the form of the invention shown in Fig. 2 is shown applied to a milling machine having the cross slides 36 and 37 to allow adjustment of the tool blank 26 and grinding wheel 27 relative to each other.

In Fig. 4 is shown the image of the tool blank 26 and grinding wheel 27 as they would be seen in the eyepiece without the master superimposed thereon and in Fig. 5 is shown the image of Fig. 4 with said image of the master superimposed thereon. In Fig. 6 is shown the image of the tool blank 26, grinding wheel 27 and master after the profile of the tool blank 26 has been ground to conform to the outline of the master and it will be noted that the master has been duplicated in the profile of the tool blank 26.

In Fig. 7 is shown a form of the invention generally similar to the form shown in Fig. 2 but in this form the reflecting prism 22 reflects the image through the lens 36 to the partial reflector 37 which reflects said image of the master drawing directly upon the work blank where it may be observed through the eyepiece or ocular 38. In this form the images are not superimposed in the eyepiece as in prior forms but the image of the master is superimposed directly upon the work blank.

In the forms of the invention shown in Figs. 2, 3, and 7 the master 13 and the optical system 15, 16, 17 and 18 associated therewith and the work blank 26 must be connected for simultaneous adjustment relative to the optical system for viewing the progress of the work comprising the objectives 21 and 33. As shown in Fig. 2 the first group of members may be mounted on the support 39 whereby adjustment of said support will simultaneously cause adjustment of said members relative to the viewing system. As shown in Fig. 7, the group of members mounted on the support 39 may be adjusted relative to the viewing system by any suitable reciprocating mechanism. Such reciprocating mechanism is conventionally indicated as an actuating crank 40 and pitman 41 connected to the support 39.

It is pointed out that the objectives 21 and 33 should have identical magnification in order that the size of the image of the master and the image of the work blank be of correct size when the images are superimposed. This, of course, means that the change in size brought about by the optical system including the objective 18 is accurately calculated to make the image 19 exactly define the contour which is to be given the work blank 26. In other words, the optical system including the objective 18 increases or decreases the size of the aerial image of the portion viewed of the master to the actual size of the work. Then by equal magnification of both this image and the work blank through the two objectives 21 and 33 the superposed parts of the master and the work blank may be studied in detail to the scale best suited to the operator.

The field seen through the objectives is necessarily small and therefore it is necessary to scan the blank and the aerial image of the master which is formed by the projection lens system located in front of the master which is usually on a considerably enlarged scale.

For this purpose the blank, master drawing and projection lens system and hence the aerial image of the master drawing are shifted simultaneously relative to the two objectives 21 and 33 (or 4 and 12) in the same direction, which direction may correspond to the main axis of the work or be at right angles thereto. This results in scanning the contour which is being developed, and the operator can scrutinize the portion thereof which requires touching up.

The method of forming the profile or shape of an article employing the present scanning device and method comprises the securing of a blank on a support relative to the forming tool. The master drawing to be reproduced on the blank is then placed in its holder and the blank and tool as well as the master are then suitably illuminated.

An aerial image 19 of the master drawing is then produced by the objective lens system. An image of the work blank and tool with an image of the master design superimposed thereon is then formed in the eyepiece. The both images may be formed simultaneously directly in the eyepiece or the image of the master drawing may be projected onto the work blank where it may be seen through the eyepiece.

The cutting edge of the tool must also be visible in the field in operating position; and since the tool moves with the viewing system comprising the objectives 21 and 33, this tool is always within the field of view of this viewing system, even though it be only a small portion of the total work blank.

The operator, while scanning the field adjusts the tool and blank relative to each other to cause the tool to operate upon the blank and because of the fact that he can see the image of the master drawing superimposed upon the blank it enables him to duplicate the outline or profile of the master drawing on the blank accurately and much more quickly than by prior methods.

It also allows a continuous forming of the blank without interruption and allows the operator to give his undivided attention to the actual shaping operation; and because of the simultaneous movement of the tool and viewing system on the one hand relative to the work blank and master on the other hand, the operator is able to continuously observe the progress of the cut or other development of the desired contour without having to alternate his attention between the blank and master as is necessary with mechanical arrangements for the purpose.

After the blank has been formed it is easy to check the finished contour by following the outline of the tool blank with the master outline which is seen superimposed thereon and checking any deviation between the two.

Instead of projecting the image of the master design directly upon the blank as described above, the image of the blank and tool may be projected in superimposed position on the master drawing if desired.

It will be seen that by a member to be observed in alignment with one of the optical systems and a similar member to be compared therewith in alignment with the optical system that the device may be adapted for use as a comparison microscope. For example two bullets may be observed by aligning one with each objective and superimposing the two images.

From the above it will be seen that we have provided simple, efficient and economical means and methods for obtaining all of the objects and advantages of the invention.

Having described our invention, we claim:

1. In a device of the character described, means for supporting a blank relative to a tool, a master to be duplicated on said blank, an optical system for projecting an image of said master on said blank and optical means for observing said image in said superimposed relation while guiding said tool and blank relative to each other to duplicate said master on said blank.

2. In a device of the character described, means for supporting a blank relative to a tool, a master to be duplicated on said blank, an optical system aligned with said master and a blank supported by said supporting means for projecting an image of said master in superimposed relation on the surface of said blank, optical means for observing said image in said superimposed relation and means for moving said blank and superimposed image simultaneously relative to said tool to duplicate said master on said blank while scanning the same through said optical means.

3. In a device of the character described, a master, an optical viewing system aligned with said master for forming an image thereof where it may be observed, means for supporting a blank on which said master is to be reproduced, and an optical system for forming an image of said master on a blank carried by said blank supporting means where said blank may be observed with the image of said master superimposed thereon during the forming of said master on said blank.

4. In an optical scanning device of the character described, a master, an optical system for forming an image of said master to the scale desired in the finished work, means for supporting a blank on which said master is to be reproduced, a tool for engaging the blank, and an optical viewing system for forming in superposed relation an image of a selected part of said image of the master and an image of the corresponding part of the blank carried by said blank supporting means, said optical viewing system and tool being supported in fixed relation to each other and the first mentioned optical system being in fixed relation to said blank support, one support being adjustable relative to the other to permit scanning of the progress of the work.

5. In an optical scanning device of the character described, a master, a common support for said master and a blank on which said master is to be reproduced, a tool for engaging the blank, an optical system for forming in a common plane with the blank an image of said master to the scale desired in the finished work, and an optical viewing system for forming in superposed relation an image of a selected part said image of the master and an image of the corresponding part of the blank carried by said support, said optical viewing system and tool on the one hand and the master and blank on the other hand being adjustable one relative to the other, the direction of said adjusting movement being parallel to said plane.

6. The method of duplicating a master on a blank consisting in projecting an image of the master on the blank, guiding a tool in engagement with the blank so as to form on the blank the contour of said master while said image is maintained on said blank.

7. The method of duplicating a master on a blank consisting in projecting an image of the master on the blank, observing the blank and image to enlarged scale while in superposed relation, and guiding a tool in engagement with the blank so as to form on the blank the contour of said master while said image is maintained on said blank.

ALVA H. BENNETT.
EDGAR D. TILLYER.